(12) United States Patent
Dwight

(10) Patent No.: US 7,469,382 B1
(45) Date of Patent: Dec. 23, 2008

(54) INTENTIONAL COMMUNITY MANAGEMENT SYSTEM

(75) Inventor: Leslie Dwight, South Deerfield, MA (US)

(73) Assignee: Gerontological Solutions, Inc., South Deerfield, MA (US)

(*) Notice: Subject to any disclaimer, the term of this patent is extended or adjusted under 35 U.S.C. 154(b) by 755 days.

(21) Appl. No.: 10/770,587

(22) Filed: Feb. 3, 2004

Related U.S. Application Data

(60) Provisional application No. 60/444,388, filed on Feb. 3, 2003.

(51) Int. Cl.
G06F 17/00 (2006.01)
G09G 5/00 (2006.01)

(52) U.S. Cl. .................. 715/738; 715/969

(58) Field of Classification Search ......... 715/771–773, 715/736, 738, 741, 743, 747, 765, 778, 971, 715/969, 737, 734, 742, 745, 749; 705/37, 705/1, 7; 707/10, 11
See application file for complete search history.

(56) References Cited

U.S. PATENT DOCUMENTS

| 6,983,258 | B1* | 1/2006 | Tye et al. | 705/37 |
| 7,168,051 | B2* | 1/2007 | Robinson et al. | 715/848 |
| 2002/0004390 | A1* | 1/2002 | Cutaia et al. | 455/424 |
| 2002/0007422 | A1* | 1/2002 | Bennett | 709/246 |
| 2002/0032634 | A1* | 3/2002 | Abrams et al. | 705/37 |
| 2002/0196740 | A1* | 12/2002 | Lee et al. | 370/250 |
| 2003/0028624 | A1* | 2/2003 | Hasan et al. | 709/220 |
| 2003/0177019 | A1* | 9/2003 | Santos et al. | 705/1 |
| 2004/0249927 | A1* | 12/2004 | Pezutti | 709/223 |
| 2005/0240605 | A1* | 10/2005 | Knoblock et al. | 707/100 |
| 2006/0248016 | A1* | 11/2006 | Ginter et al. | 705/54 |

\* cited by examiner

*Primary Examiner*—Steven P Sax
(74) *Attorney, Agent, or Firm*—Philip H. Haymond

(57) ABSTRACT

A method and computer network for managing an intentional community, such as a continuing care residential retirement community. Such a community includes members who have rights to use physical resources such as facilities and services that are managed by a management entity of the intentional community. The members are able to interact with management and outside vendors with a graphical user interface that represents the community, and perhaps vendor sites.

16 Claims, 4 Drawing Sheets

A - Intentional CommunityPRIOR ART

INTENTIONAL COMMUNITY MANAGEMENT SYSTEM

CROSS-REFERENCE TO RELATED APPLICATIONS

This application claims benefit of the filing date of U.S. Provisional Application 60/444,388, entitled Intentional Community Management System, inventor L. Dwight, filed Feb. 3, 2003, incorporated herein by reference.

FIELD OF THE INVENTION

This invention relates to a computer network system, a system for networking computers, and more particularly to a method, apparatus and program product for a computer network for organizing an intentional community of users.

BACKGROUND OF THE INVENTION

Intentional communities are those groups of individuals who share common physical resources or facilities as a common environment in which the members participate. Examples of intentional communities are cruise lines, hotels, resorts, health clubs, homeowner associations, residential golf communities or universities. A member is an individual admitted to the intentional community and as such the interests and needs of the members of the intentional community are of a specific nature relating to the nature or mission of that intentional community.

Also typical of an intentional community is a separate management structure where individuals have specific management duties. Because an intentional community is a community environment, there is an ongoing interaction between the members and management to administer the activities and facilities of the community.

Continuing Care Retirement Communities ("CCRC"'s), for example, may be characterized as an intentional community comprised of residents (members) of senior living communities that are administered by professional management and include physical assets such as dormitories, vehicles, recreational facilities, etc. CCRC's typically use a variety of "inside" services administered or provided by management that are accessed and advertised within the community via bulletin boards, fliers, announcements and other utilities to communicate and implement available services, amenities and conduct transactions related to the facilities used by the intentional community. Monthly calendar and activity boards, for example, are generally placed near the elevator or front desk, and are a principal source of information about dining menus, current activities, and newsworthy events. A daily menu might be provided on a bulletin board located just outside the entrance of a dining room, while a bulletin board located next to the residents' mailboxes might provide the residents with access to other types of information. At many CCRC's the front desk plays a major role in assisting the residents with accessing the numerous services provided by the community, and is similar to that of a hotel concierge.

There are typically also a number of "outside" services provided by third parties that are of particular relevance to members of an intentional community as well. These may be commercial services or vendors that are separate entities from the management and otherwise apart from any information distribution system or utility for managing business relevant to the members of the intentional community. With respect to a CCRC, for example, local medical, transportation, home care, dry cleaning or entertainment services might be needed by a predominant number of the members of the intentional community. There may be other, non-commercial outside services needed as well, such as a utility to communicate with friends, relatives and government offices.

These outside services typically have a low or extemporaneous integration with the information distribution system used within the intentional community, or with use of the other facilities used by an intentional community. Members usually have to individually locate and make arrangements with the outside service, and marketing to members of an intentional community by these outside services is conducted in a haphazard and inefficient manner. For example, on occasion a merchant might arrive at a special arrangement with the facilities manager for providing goods to the members and this is presented to the community members through fliers or other postings. A third party may need to use the facilities of the intentional community, to offer instructional classes of health screening for example, so special arrangement with the facilities manager need be made and this is presented to the community members through fliers or other postings, usually without benefit of useful feedback by the community members.

Present systems used for the scheduling, transactional and informational needs of the members of an intentional community are therefore fragmented and difficult to use. Without an interactive and centralized source of information and data collection there is no utility to conduct the ordering and payment for services pertaining to that intentional community or a utility to do so in an interactive manner, in real time. Moreover, any ancillary commercial services attractive to members of an intentional community may be separate and apart from any information distribution system used by that intentional community.

What is needed then is a centralized, integrated system for delivering such communications, scheduling, transactional, informational and other services to members of the intentional community.

Such an integrated system would reduce the need for an individual member to locate and engage disparate services or to have to schedule services at different locales. Such a system might also enable a centralized data collection point to coordinate transactions and reduce the need for redundant data entry common to most or to all of the inside and outside services offered by an intentional community.

SUMMARY OF THE INVENTION

Using a personal computer, Web TV, kiosk, Personal Digital Assistant or equivalent terminal device for accessing a computer network, a member of an intentional community accesses one or more computers having the aforesaid scheduling, transactional, informational, ancillary commercial and data collection services available. The system would typically be used on a closed computer network such as an intranet, or be available to members only over the Internet global communications network, with advertising and announcements available to the public but functionality accessible only to members of the community.

A graphical user interface (GUI) written in hypertext markup language (HTML) may be used on the computer access page that is representational of the physical resources and transactional aspects of the intentional community itself. Much as one would stroll down the streets of a town, a member accesses information, schedules and pay for services in different virtual "centers". The names of the centers might reflect the type of service or information available. Further using the example of a CCRC intentional community the pages might be comprised of Home (an introductory page), Office Center (facilities management), Dining Center, Fitness and Sports Center, Social Center, Service Center, and Store (for ancillary commercial services). The GUI might appear as a typical Internet web page does, written with HTML and including links to access each of the centers from a home page, the implementation of which will be readily appreciated by those of skill in the art.

One method of the present invention includes the steps of providing a computer network implementing an Intentional Community Management System. A user visits one or more sections of that system to obtain information, transact business or schedule an event. The method may further include the steps of selectively restricting access by users of the Intentional Community Management System of the present invention depending on their status. For example, members, non-members, management and outside vendors and service providers may be accorded different access privileges.

Another method of the present invention may further include the steps of charging users for varying levels of access to the Intentional Community Management System, to members of the community on the network, to generate revenue for the intentional community. The method may further include the steps of advertising the intentional community to potential members, for example on the Internet.

BRIEF DESCRIPTION OF THE DRAWINGS

FIG. 2 also represents corresponding nodes of a computer network.

DETAILED DESCRIPTION OF THE INVENTION

Figure 1:
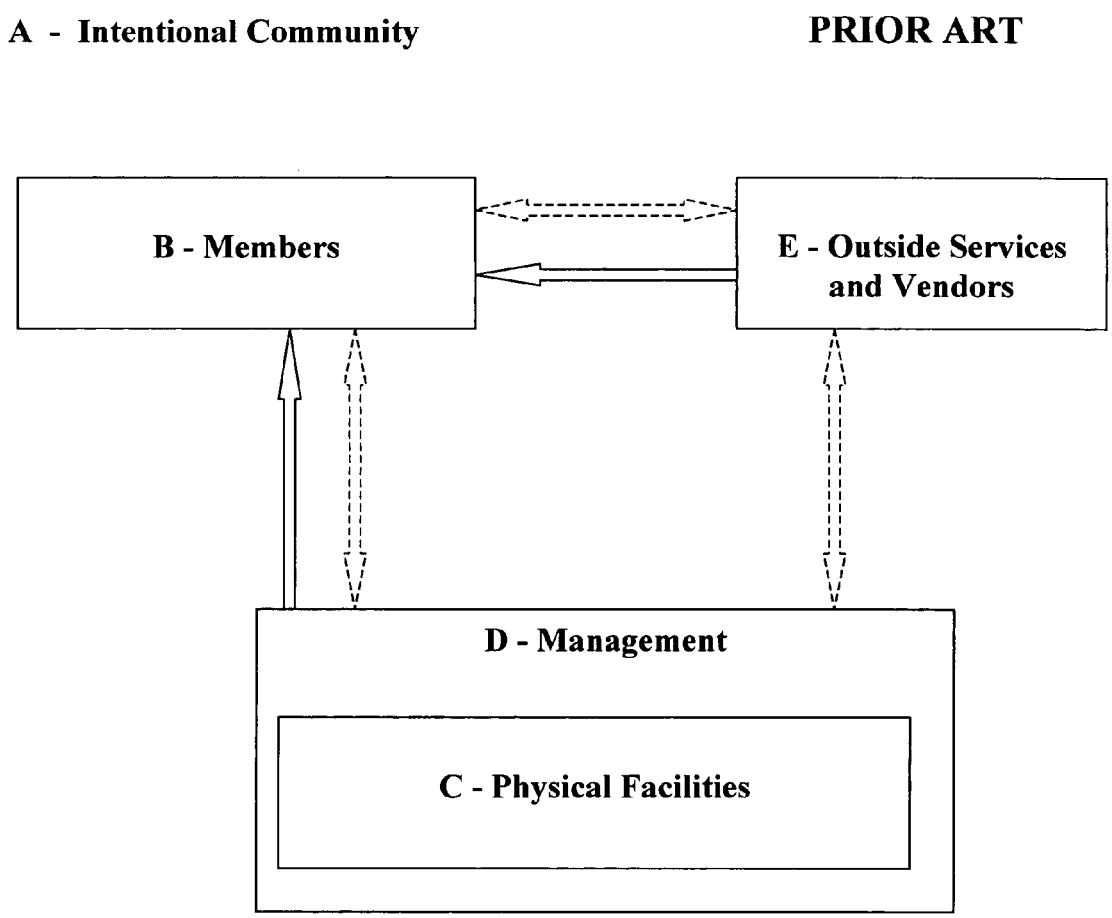
FIG. 1 is a block diagram of an exemplary intentional community of the prior art.

The following detailed description, and the figures to which it refers, are provided for the purpose of describing examples and specific embodiments of the invention only and are not intended to exhaustively describe all possible examples and embodiments of the invention. Further objects and advantages of the invention will become apparent to one skilled in the art by reading and understanding the following detailed description and the drawings to which it refers, wherein the advantages of the present invention are set forth in the claims when considered in conjunction with the accompanying drawings in which like parts bear like reference numerals.

Functional Design and Methods of the Computer Network of the Present Invention Referring now to FIG. 1 the structure of a typical intentional community A is shown. Members B of the intentional community A share the use of the physical facilities C and the physical facilities are managed by management D, i.e. individuals specializing in management functions. In this example communication within the intentional community A for making arrangements concerning the intentional community is one way (shown by arrows), for example by the posting or mailing of fliers, or only on ad hoc bi-directional, two-way basis (shown by dotted double arrows), where a member individually contacts management or an outside entity about a particular issue. Management D provides the services of facilities C use, such as dining facilities, and ancillary services such as landscaping, mail delivery, etc. Third parties, entities outside of the intentional community E, may be vendors of services of interest to members of the intentional community, governmental entities, relatives, etc., but again the communication between the members B, the management D and the outside entities E is one way or on an extemporaneous two-way basis (shown by dotted double arrows). The outside entity may be an outside vendor or service provider who might post fliers, newspaper advertisements, telephone book yellow page advertisements, etc. offering a service to members (one way communication) and be contacted on an individual basis by a member (ad hoc two-way communication). In this model management D does not necessarily administer, facilitate or coordinate the communications or services offered for the members B by the outside entities E.

Figure 2:
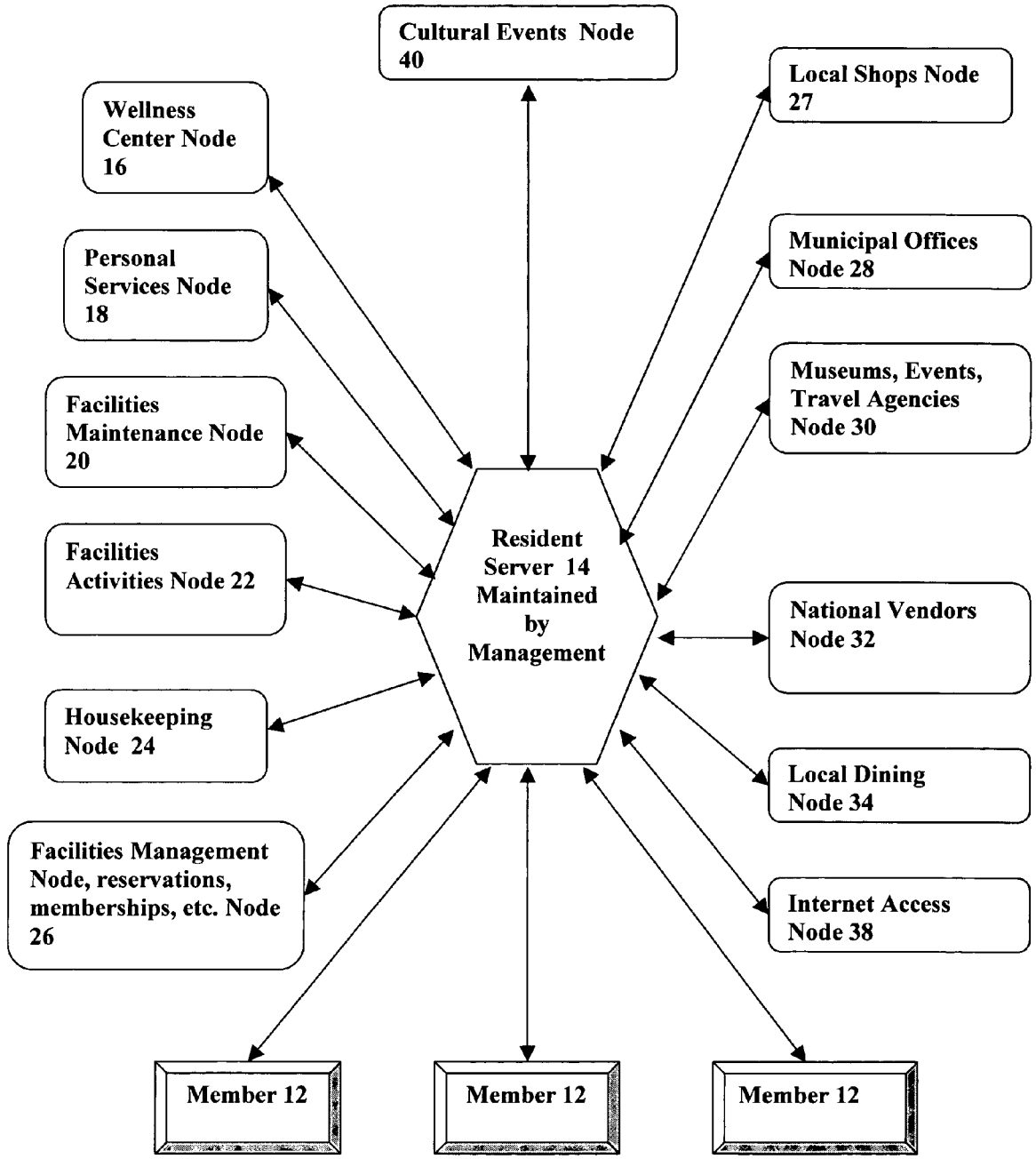
FIG. 2 is a block diagram of an embodiment of the present invention showing the interaction of members and others with the intentional community.

FIG. 2 shows the interactions of an intentional community according to a method of the present invention, a Resident node or server 14 is provided by the management of the intentional community to members 12. FIG. 2 also shows the functional arrangement of apparatus suitable for implementing the Intentional Community Management System of the present invention. A computer system implementing an Intentional Community Management System is provided for use by members of an intentional community to allow the members direct access to inside and outside services provided to members of the intentional community. FIG. 2 therefore also shows a computer network 10 comprised of a Resident node server 14 and one or more client servers, shown by way of example as the 16-38 remaining nodes. It will be appreciated by those in the art that one or more of the nodes may be physically located on one or more computers acting as servers, the functions of any single node may be executed by one or several computers as well, and that the resident node server could be a server accessible by the Internet. Each server is shown here on a separate computer in FIG. 2 to more clearly show their distinction as separate nodes, for illustrative purposes.

Services and facilities that are usually offered by the intentional community itself are shown on the left (nodes 16-26) and those services and amenities usually offered by outside entities are shown on the right (nodes 27-38). Some services are of a mixed inside/outside nature, such as cultural events 40 where management may provide space for an outside performer.

The Intentional Community Management System of the present invention presents great efficiencies over existing methods and apparatus for administering an intentional community. Each member 12 and node 16-38 may effectively communicate with each other, with the level of access to each node 16-38 being regulated by management at the resident server 14. Communication between and among the members, the management and the outside entities is two-way, bi-directional (shown by double-headed arrows) through the resident server 14. At the very least the communication is bi-directional to the extent that there is a much more efficient system of electronic messages and replies, but with the present system two-way interactions between or among the nodes may be carried out in real time among the members, management and outside entities.

The system of the present invention may be used by management to administer activities and facilities use in a much more highly coordinated manner. Using a CCRC as an example of an intentional community, the user, a CCRC resident, may be connected to their families, administrators, and staff to access information, schedule services, reserve facilities and communicate or otherwise transact business.

Figure 3:
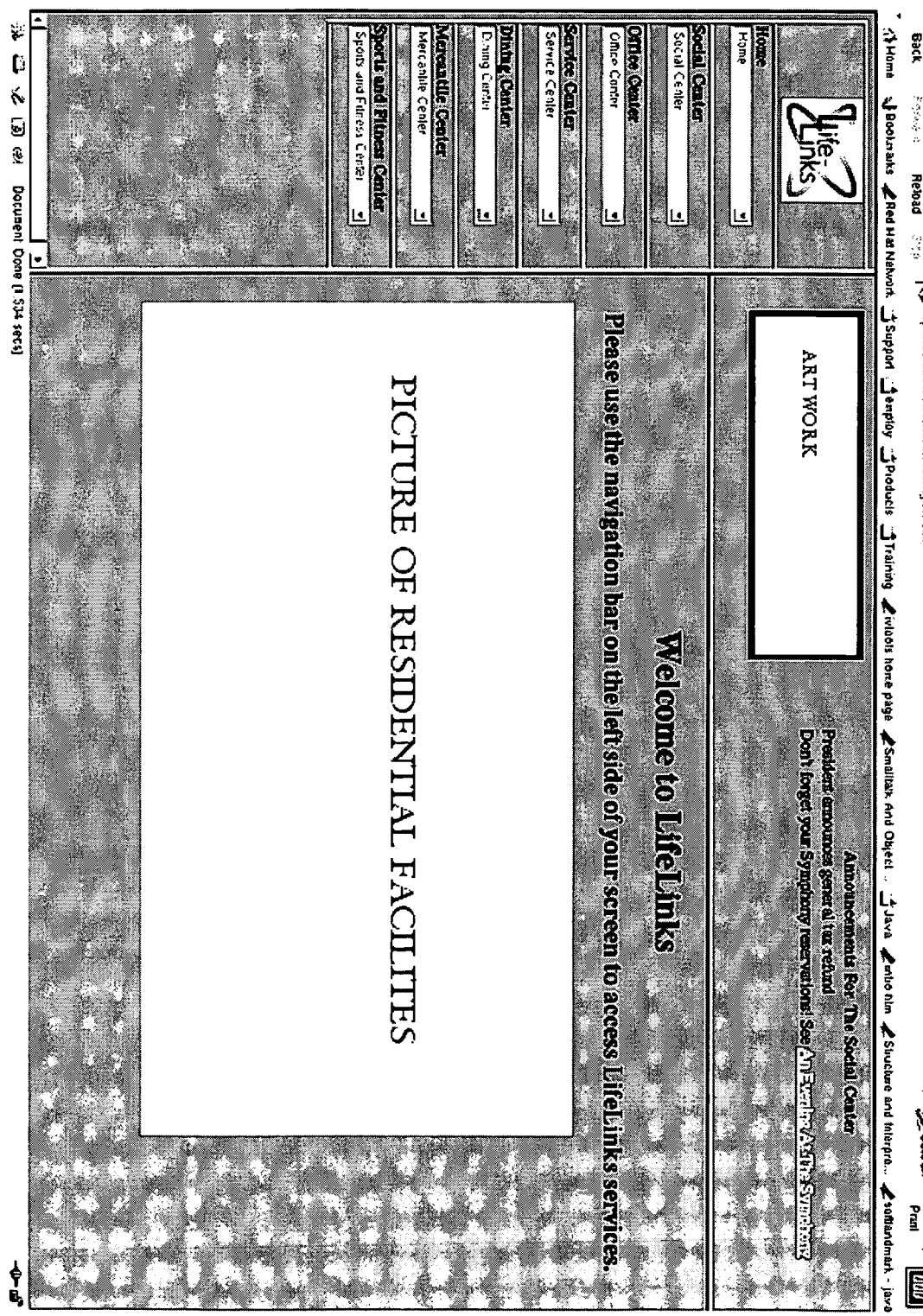
FIG. 3 is an example of an HTML graphical user interface page that might be used to implement the present invention.

Referring now to FIG. 3 a graphical user interface (GUI) page is shown that may be used with the present invention. The architecture of page organization is modeled in this example on the physical and transactional aspects of the intentional community itself. Much as one would stroll down the streets of a town, a member can access information, schedules and pay for services in different virtual "centers".

The names of the centers might reflect the type of service or information actually available, for example when used with a CCRC a page may have nodes accessible named Home, Office Center, Dining Center, Fitness and Sports Center, Social Center, Service Center, and Mercantile Center. In the CCRC environment, for example, the method, system and program product of the present invention may be implemented by allocating nodes for:

Resident And Family Members: to interact and for relatives to monitor member status.

Home: The community and member home page, this page displays the calendar and announcements for the community and the member: it phases out paper postings next to the elevator or outside of the dining room.

Social Center: Community events, local theaters, links to Internet, music/video, etc.

Office Center Governance, member directory, by-laws, community rules and regulations, any disclosure required by state regulators, chat room, staff headquarters, job postings, etc.

Services: Community provided services, such as maintenance, personal care, housekeeping, beautician, banking, barber, computer support, etc.

Dining Center: Facility dining room reservations, menu display, take-out and delivery, local restaurant links and reservations, etc.

Mercantile Center: Community shops, Local and national merchants, e-commerce links, personalized shopping, etc.

Sports and Fitness Center: Community and local health facilities, health club, masseuse reservations, personal trainer appointments, link to health information sites, etc.

The present invention therefore emulates the functions of a community and may be implemented where there are a group of users that may be characterized as an intentional community having access to the physical facilities represented. The present invention functionally streamlines user interactions, providing members of an intentional community with simultaneous access to the services and facilities available.

In the CCRC example the community residents, residents' families, administrators, vendors and staff are provided with a unique tool for easy and efficient communication. Because the users and the intentional community facility will likely use the invention daily in managing services, it will likely be updated constantly by the community members and eliminate outdated information, it will also allow bi-directional communication rather than the static, one way informational announcements that are currently used.

For residents, the present invention provides a channel to the residential community and its services as shown in FIG. 2 and is also a channel to the community outside the facility, the outside services of FIG. 2. It provides mechanisms for senior living communities to provide information and services to its members, and members to access merchants in a manner that is managed by the facility. FIG. 2 represents many of the potential interactions a resident may have using the present invention as a tool.

The present invention may be used to integrate communications among the participating parties as well. For example, a resident at a CCRC typically requires maintenance services. Currently, she might have to call the front desk with her request and wait for someone to respond. With the present invention, either through her own computer or web-appliance, a centrally located computer/kiosk or via the front desk person (concierge), she could make her request on-line by scheduling a specific open time slot in an e-appointment book and recording details of the problem. At the same time, she can, for example, view upcoming events for the week, sign up for a museum outing, check the lunch menu for the day, and determine if the local pharmacy is having a sale. She can check her email account for messages from family and friends, as well as email announcements from advertisers of her choosing (perhaps printing a coupon from a local pharmacy e-message to use during their upcoming sale).

By way of example, with the present invention a utility might be included that allowed the resident's out-of-state daughter to monitor the maintenance log to confirm that her mother has scheduled the work and check again when it is completed (if her mother has given her permission for this level of information). She can view the activities her mother has signed up to participate in for the week, and check her own e-mail account, responding to any messages from her mom. The daughter can also schedule services on behalf of her mother or sign up to participate in activities herself.

Intentional community members might be further allowed and enabled to post announcements in the Social Center providing the member residents with a public venue to announce their projects and events.

The present invention can also be used as a management tool by the administrators and staff of an intentional community, here a CCRC, to streamline their operations. For example, each department in the facility might customize its "center" GUI page of FIG. 3 to reflect the specific services and offerings of the department. The Activities Director might maintain a schedule of activities and events in the Social center. The CCRC main kitchen might post the upcoming menu in the Dining center and update it regularly. A beauty parlor might post its appointment book on a page so that members can schedule their visits.

The present invention also affords substantial efficiencies for administrators, staff and/or those responsible for the continued operation of the facilities of an intentional community by effectively shifting a large part of the scheduling and data input tasks from the staff and distributing it across the membership. This shift reduces staff overhead in a fashion similar to the way banks have shifted many banking tasks through the use of Automatic Teller Machines (ATMs). The real-time nature of the data additionally assures that administrators and staff members are delivering the products, services, and information the members want on schedule. The present invention may be used to provide facility maintenance personnel with a daily log of requests and staff responses, as well as customer feedback. Facility managers can access a record of all requests and completed work orders, in an electronic record.

The facilities manager of an intentional community may also transfer the coordination and selection of services to the residents and outside service providers, as well as provide the facility's marketing department with a unique and dynamic presence through a possible connection to the Worldwide Web. Using the present invention, the facility can post information at their Internet web site that allows interested parties to learn more about the facility and its offerings.

The present invention also provides a centralized, easily maintained framework for the timely management and maintenance of service offerings and community information of the intentional community. A staff member would be able to update the center throughout the day, daily, weekly, or monthly—whatever is appropriate to the services being offered. Because the present invention is the facility's service management tool, the facility will best ensure that it is always up-to-date. This continuous updating of information assures that the node pages are dynamic. This continuous updating will also serve to portray a vital community to any visitors to portions of the system that are freely available over the Internet. The continuous updating also allows management and members of the intentional community the ability to document the services delivered to the members and documentation of the services utilized by members.

The network therefore builds a virtual active matrix between real (physical) communities. Community membership in the intentional community forms the basis for integrating the appropriate nodes in a computer system to allow seamless integration of the utilities, products and services of that community.

Accordingly an aspect of the present invention is to implement the Intentional Community Management System of the present invention on a computer network to manage an intentional community. Participants or nodes in the Intentional Community Management System of FIG. 2 may have varying access privileges in the computer network system. For example a member may be allowed to view and reserve the physical facilities of the intentional community. A member's relative may, on the other hand, be limited to electronic communication with the member, with the member's physician or care-giver, etc. with such access depending on permission given by the member.

According to a further aspect of the invention the network may be designed to obtain revenue by the additional step of offering limited membership or use of the facilities of the intentional community to non-residents, for example allowing individuals to join as non-resident members, or allowing the facilities to be used by non-resident family members or the staff of the intentional community. In the CCRC example, non-residents might be invited to join the intentional community as non-resident members, to enjoy use of the pool, the gym, transportation to events, activities, access to geriatricians, and any other specialized services offered within the facility.

According to another aspect of the computer network of the present invention, revenue may be generated through charging for access privileges to the Intentional Community Management System to merchants and other commercial services, the Outside Services of FIG. 2. These entities may advertise on the network to intentional community members and be charged by the intentional community for such access. This provides a direct and highly targeted link between the intentional community members and those seeking to market goods and services to those members.

In the case of entities providing commercial outside services to an intentional community, such privileges may be based on their type of advertising, with increasing fees charged by the intentional community for more complex advertising, e.g. vendors of outside services who advertise to members of the intentional community with simple HTML banner advertisements might be charged the least, while merchants who choose to advertise their menus, sales, or other dynamic information on their page or pages might be charged more; those having a utility to maintain or modify information through their own server, through a maintenance screen, might be charged additionally as well.

There may be other levels of and types of access granted to merchants who are charged accordingly. For example a utility may be added to the Intentional Community Management System of the present invention to help in the merchandising of goods and services to intentional community members, such as an appointment function used to reserve time periods for the services, to indicate holidays, etc. Email functionality might be offered to send an e-mail or phone messages to a member to remind them they have an upcoming appointment.

In the preferred embodiment the computer network of the present invention is implemented as a private/public site that can be customized to the facility and the surrounding community and that can be personalized to the individual user. The present invention may be customized for each intentional community with the goods and services it offered within each Intentional Community Management System, thus allowing the intentional community administrators to choose the level of advertising and access to members allowed.

The present method and apparatus might also include a permission-based Email marketing (opt-in) program, where email that is sent only to those who have requested or consented to receive email promotion by joining email lists. Members of an intentional community might sign-up to receive commercial email messages about their areas of interest by providing their email addresses. When members initially sign-in to a permission-based email (opt-in) utility used with the present invention, they might be requested to fill out a profile on a page that appears as an interactive survey.

Members might be given the option to provide demographic and psycho-graphic information such as age, gender, ethnicity, profession, interests, hobbies and zip code, as well as additional data. Members can also express interest in specific products or service categories. The member may then be given the option to grant permission to receive Email advertising from vendors related to the facility or their particular demographic and psycho-graphic information. The network may be set to allow, after a member grants permission, a merchant to send that member related information via the IC server or through the management node of the present invention. Such Emails may include newsletters, announcements, catalogs, product offering, discounts, coupons, etc. Such emails might also have an Internet link, linking the user to the Web URL home page of that advertiser, or to a specific page for the product or service being offered. Members using the computer network of the present invention benefit from receiving this relevant news of advertising, the facility administrators may benefit from revenue generated from advertising fees charged to outside service providers and vendors. Finally, vendors and outside service providers benefit because the highly targeted advertising is cost effective, resulting in a high response rate.

The present invention may also be used to allow members to make online purchases directly from a vendor using existing programming products and methods appreciated by those of skill in the art.

The present invention therefore provides an intentional community with methods and apparatus to market their intentional community for revenue in addition to what is collected directly from their members.

Physical Design of the Computer Network of the Present Invention

The individual components of the exemplary computer network shown in FIG. 2 represent both physical servers and virtual nodes of a network, where each node represents a service. FIG. 2 therefore also shows a computer network 10 comprised of an Intentional Community server (IC Server) shown centrally as "Resident Server") 14 and one or more client servers, shown here as 16-38, the remaining nodes. The remaining nodes are typically in bi-directional, two-way communication with the Resident IC Server node of the network. One or more or all of the nodes may be physically located on one or more computers acting as servers, the functions of any single node may be executed by one or more computers as well, each server is shown here on a separate computer in FIG. 2 to more clearly show their distinction as separate nodes, for illustrative purposes. Those of skill in the art will appreciate that actual implementation may be accomplished many ways. An example is shown in FIG. 2a. A User may interactively (shown by arrows) contact an Internet web server for appointment or event information. The web server may use a Java® servlet to handle requests that interact with a database server. Each servlet may interactively process a request to the separate database server to include the access status of the user. A member using the servlet, for example, will receive event and appointment information corresponding to members or to that individual member; a non-member may receive different appointment or event information, information appropriate for non-members.

Using a personal computer, Web TV, kiosk Personal Digital Assistant or equivalent terminal device for accessing a computer network, a member 12 of an intentional community accesses Resident Server to begin a network session, preferably over Internet, but a intranet or a Local Area Network (LAN) might be used instead, to request data from the IC server, in this example using the hypertext transfer protocol (HTTP) network protocol. There is typically a log-in page where the user identifies herself and submits a password to gain full access to the system. The data files accessed comprise what are commonly referred to as "pages" to provide a Graphical User Interface. Pages are typically written in the computer language HTML, extensible style sheet language (XSL), or extensible markup language (XML), and clan be viewed or displayed through a GUI browser program such as "Netscape Communicator" from Netscape Communications Corporation or "Internet Explorer" from Microsoft Corporation. A customized proprietary browser may be used instead, for use with personal computer, Web TV, at a kiosk, with a Personal Digital Assistant or equivalent terminal device.

Each node may be represented by one or more HTML pages, each of which is a GUI file that can include a mixture of text, image, video, and audio data, such as FIG. 3. Thus, the user may engage communication with other nodes of the network that are, in this example, client servers of the network. The user may access and further interact with the node through written commands or by using a mouse or other equivalent device to access the pages of the nodes.

A request on the network 10 for a page results in a message being sent from the user's browser to the IC server 14, to cause the loading of the requested page. Information about the user may be provided to the IC server at this point, for example by use of "cookies." Typically, cookies are stored on a user's computer system. Thus, for example, when a user's browser requests a network node the server that represents that node also provides any cookies it has that originated from that user. If no cookie has already been provided, the server can provide one with the Web page data, which the browser will store. Thereafter, when the browser again requests a page from the Web site, the browser will automatically provide the stored cookie to the server along with its request for a page. It will be appreciated by those of skill in the art that various cookie techniques can be used, such as using a session type of object and a session type of cookie, where one or both does not survive a session.

A data collection tool such as the "opt-in" protocol recited above may be used where the resident initially enters personal information into an account that may be partially or fully available to the party they are interacting with and such information availability may be tailored to the individual that is being communicated with. For example, the resident may wish to provide demographic and psycho-graphic information as detailed above, or simply to make his or her address and monthly schedule available to some relatives, his or her credit card information available to some commercial vendors, etc. The implementation of such a programming protocol will be appreciated and understood by those of skill in the art.

Figure 4:
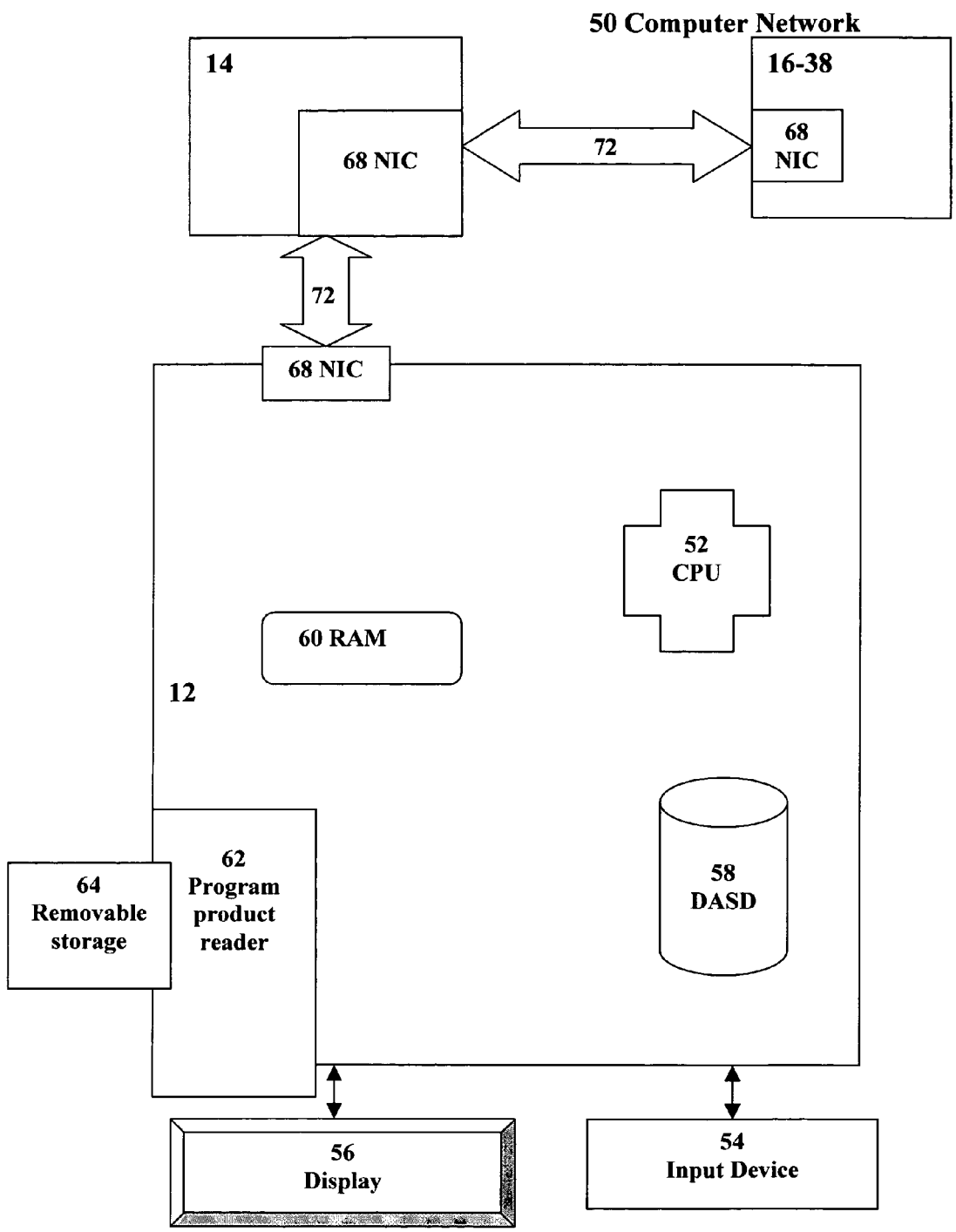
FIG. 4 is a schematic of an embodiment of the computer network the present invention.

The system may be implemented using the computer network 10 of FIG. 2. FIG. 4 shows exemplary computers, 14 and (shown in more detail) 12 of the type that might comprise a network of one or more members 12, the servers 10 and nodes 14-38 of FIG. 2. It is understood that the nodes may be present on one or more physical computers, requiring, at a minimum at least a user computer 12 and a network computer 14. The other nodes, 16-38 are shown on a separate computer for illustrative purposes only. It is also understood that a personal computer, Web TV, kiosk Personal Digital Assistant or equivalent terminal device for accessing a computer network is used by a member 12 of FIG. 2 to access the network.

Each computer operates under control of a central processor unit (CPU) 52, such as a "Pentium" microprocessor and associated integrated circuit chips, available from Intel Corporation of Santa Clara, Calif., USA. A computer user can input commands and data from a keyboard, computer mouse, touch screen, or equivalent device 54, and can view inputs and computer output at a display 56. The computer 12 also includes a direct access storage device (DASD) 58, such as a hard disk drive. The memory 60 typically comprises volatile semiconductor random access memory (RAM).

The member computer 12 may preferably include a program product reader 62 that accepts a program product storage device 64, from which the program product reader can read data (and to which it can optionally write data). The program product reader can comprise, for example, a disk drive, and the program product storage device can comprise removable storage media such as a magnetic floppy disk, a CD-R disc, a CD-RW disc, or DVD disc.

Each computer shown here as 12, 14 and 16-38 can communicate with another computer over the computer network 50 (such as through the Internet, an intranet or LAN) through a network interface 68 that enables communication over a connection 72 between the network 50 and the computer. The network interface 68 typically comprises, for example, a Network Interface Card (NIC) or a modem that permits communications over a variety of networks.

The CPU 52 operates under control of programming steps that are temporarily stored in the memory 60 of a computer. When the programming steps are executed, the computer performs its functions. Thus, the programming steps implement the functionality described above. The programming steps can be received from the DASD 58, through the program product storage device 64, or even through a network connection 72. The program product storage drive 62 can receive a program product 64, read programming steps recorded thereon, and transfer the programming steps into the memory 60 for execution by the CPU 52. As noted above, the program product storage device can comprise any one of multiple removable media having recorded computer-readable instructions, including magnetic floppy disks and CD-ROM storage discs. Other suitable program product storage devices can include magnetic tape and semiconductor memory chips. In this way, the processing steps necessary for operation in accordance with the invention can be embodied on a program product.

Alternatively, the program steps can be received into the operating memory 60 over the network 50. In the network method, the computer receives data including program steps into the memory 60 through the network interface 68 after network communication has been established over the network connection 72 by well-known methods that will be understood by those skilled in the art without further explanation. The program steps are then executed by the CPU 52 thereby comprising a computer process.

It should be understood that the above description of the construction of the devices 12-38 of the computer networks 10 and 50 illustrated in FIGS. 2 and 4 are for illustrative purposes. It will be understood by those of skill in the art to not only include the above structural description but can have an alternative construction, so long as the Resident server 14 computer can communicate with the other nodes 16-38 and a member 12 illustrated in FIG. 2 and support the functionality described herein.

The present invention has been described above in terms of a presently preferred embodiment so that an understanding of the present invention can be conveyed. There are, however, many configurations for an intentional community management system not specifically described herein but with which the present invention is applicable. The present invention should therefore not be seen as limited to the particular embodiments described herein, but rather, it should be understood that the present invention has wide applicability with respect to event and resource management generally. All modifications, variations, or equivalent arrangements and implementations that are within the scope of any patent claims issuing hereon and should therefore be considered within the scope of the invention.

What is claimed is:

1. A computer network for managing an intentional community comprising:
    an intentional community comprised of residential property managed by a common management entity, having a plurality of members who are residents that have rights to use facilities consisting of the services managed by the management entity and of physical property controlled by the management entity,
    a computer terminal acting as a node in a computer network operated by the management as a server,
    one or more computer terminals operated by individual members comprising additional nodes on the network,
    the computer network includes one or more graphical user interface pages that are representative of the facilities of the intentional community,
    wherein communications concerning the facilities are conducted between the management of the intentional community and a member of the intentional community over the network graphical user interface, and further including a data collection tool to collect demographic and facilities usage data provided by members to the management for use by management in managing the intentional community, and
    data from the data collection tool is used by a third party to target advertising to a member based on that member's facilities usage and demographic data.

2. The computer network for managing an intentional community of claim 1 further including an Email utility where permission for receiving Email by a member is based on a user granting permission to be sent Email by another user of the network.

3. The computer network for managing an intentional community of claim 1 further including an Email utility where permission for receiving Email by a member is based on the data collected by the data collection tool.

4. The computer network for managing an intentional community of claim 1 wherein the vendors and authorized non-vendors are granted different levels of access to the network than are granted to the members.

5. The computer network for managing an intentional community of claim 1 wherein the vendors pay the intentional community in exchange for access to the network.

6. The computer network for managing an intentional community of claim 1 wherein the network is configured to allow vendors to transact monetary payment transactions with one or more members over the network.

7. The computer network for managing an intentional community of claim 6 wherein the network is configured to allow vendors to transact monetary payment transactions with one or more members over the network, and the intentional community is paid by a vendor based on a transaction.

8. The computer network for managing an intentional community of claim 4 wherein the computer network may be accessed through the Internet global communications network by members and management and includes one or more a graphical user interface pages that advertise the intentional community to public users who are those users that are not management, are not members, are not vendors and are not authorized non-vendors.

9. A method for managing an intentional community comprised of the steps of:
    providing for an intentional community comprised of residential property managed by a common management entity, having a plurality of members who are residents that have rights to use facilities consisting of the services managed by the management entity and of physical property controlled by the management entity, a computer network including:
        a computer terminal acting as a node in a computer network operated by the management as a server,
        one or more computer terminals operated by individual members, comprising additional nodes on the network,
        the computer network includes one or more graphical user interface pages that are representative of the facilities of the intentional community,
        the computer network further includes a data collection tool to collect demographic and facilities usage data provided by members to the management for use by management in managing the intentional community,
        communications concerning the facilities are conducted between the management of the intentional community and a member of the intentional community over the network graphical user interface, and,
        data from the data collection tool is used by a third party to target advertising to a member based on that member's facilities usage and demographic data.

10. The method for managing an intentional community of claim 9 wherein the computer network further includes an Email utility where permission for receiving Email by a member is based on a user granting permission to be sent Email by another user of the network.

11. The method for managing an intentional community of claim 9 wherein the computer network further includes an Email utility where permission for receiving Email by a member is based on the data collected by the data collection tool.

12. The method for managing an intentional community of claim 9 wherein the vendors and authorized non-vendors are granted different levels of access to the network than are granted to the members.

13. The method for managing an intentional community of claim 9 wherein vendors pay the intentional community in exchange for access to the network.

14. The method for managing an intentional community of claim 9 wherein the computer network is further configured to allow vendors to transact monetary payment transactions with one or more members over the network.

15. The method for managing an intentional community of claim 9 wherein the computer network is configured to allow vendors to transact monetary payment transactions with one or more members over the network, and the intentional community is paid by a vendor based on a transaction.

16. The method for managing an intentional community of claim 9 where the computer network may be accessed through the Internet global communications network and the computer network further includes
- one or more a graphical user interface pages that advertise the intentional community to public users who are those users that are not management, are not members, are not vendors and are not authorized non-vendors.

\* \* \* \* \*